US012654104B2

(12) United States Patent
Du et al.

(10) Patent No.: US 12,654,104 B2
(45) Date of Patent: Jun. 16, 2026

(54) GAME INTERACTIVE CONTROL METHOD AND APPARATUS, STORAGE MEDIUM AND ELECTRONIC DEVICE

(71) Applicant: Beijing Zitiao Network Technology Co., Ltd., Beijing (CN)

(72) Inventors: Xueying Du, Beijing (CN); Chi Li, Beijing (CN); Yutong Yang, Beijing (CN); Guoan Han, Beijing (CN); Jiaqi Shi, Beijing (CN); Bei Shi, Beijing (CN); Hongliang Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 230 days.

(21) Appl. No.: 18/466,494

(22) Filed: Sep. 13, 2023

(65) Prior Publication Data

US 2024/0123347 A1 Apr. 18, 2024

(30) Foreign Application Priority Data

Oct. 13, 2022 (CN) .......................... 202211255805.1

(51) Int. Cl.
*A63F 13/56* (2014.01)
*A63F 13/5372* (2014.01)
*A63F 13/67* (2014.01)

(52) U.S. Cl.
CPC .......... *A63F 13/56* (2014.09); *A63F 13/5372* (2014.09); *A63F 13/67* (2014.09)

(58) Field of Classification Search
CPC ...... A63F 13/56; A63F 13/5372; A63F 13/67; A63F 13/35; A63F 13/822; A63F 13/847; A63F 13/65; A63F 2300/6027; A63F 2300/807
See application file for complete search history.

(56) References Cited

U.S. PATENT DOCUMENTS

2008/0097948 A1* 4/2008 Funge ..................... A63F 13/67
706/47
2020/0171382 A1 6/2020 Agoston

FOREIGN PATENT DOCUMENTS

| CA | 3157637 A1 | 6/2021 |
| CN | 111666396 A | 9/2020 |
| CN | 115581921 B | 6/2025 |
| WO | 2019133919 A1 | 7/2019 |

* cited by examiner

*Primary Examiner* — Ke Xiao
(74) *Attorney, Agent, or Firm* — Astute IP Law Group

(57) ABSTRACT

The present disclosure relates to a game interactive control method and apparatus, a storage medium and an electronic device, and relates to the technical field of computers. According to the method, by determining the game intention of the agent according to the game state information, and inputting the game state information, the game communication information and the game intention into the communication prediction model, the target communication content corresponding to the agent is obtained, and then the target communication content is outputted, so that the player character determines a game action to be executed by the agent based on the target communication content. This can not only improve the gaming activity when the real player is battling against the agent, but also enable the real player to know the game intention of the agent so as to cooperate with the agent and improve the gaming quality.

17 Claims, 7 Drawing Sheets

101

Game state information and
game communication
information

Target communication
content

102

GAME INTERACTIVE CONTROL METHOD AND APPARATUS, STORAGE MEDIUM AND ELECTRONIC DEVICE

CROSS REFERENCE TO RELATED APPLICATIONS

This application claims priority to CN. Application Ser. No. 202211255805.1, filed Oct. 13, 2022, and titled "GAME INTERACTIVE CONTROL METHOD AND APPARATUS, STORAGE MEDIUM AND ELECTRONIC DEVICE", the disclosure of which is incorporated herein by reference in its entirety.

FIELD

The present disclosure relates to the field of computers, and specifically to a game interactive control method and apparatus, a storage medium and an electronic device.

BACKGROUND

In the business of electronic games, applying Artificial Intelligence (AI) to games has become a development trend. With the generation iteration of game AI technology, game AI can serve as a competitive opponent of a human player as well as a game partner battling side by side with the human player in electronic games, which is of great significance for improving game experience and the player's activity.

However, current game AIs, although able to reach the level of top human players in the aspect of competitive capability, lack communication with human players, which causes the human players to fail to cooperate with game AIs.

SUMMARY

This Summary is provided to introduce a selection of concepts in a simplified form that are further described below in the Detailed Description. This Summary is not intended to identify key features or essential features of the claimed technical solutions, nor is it intended to be used to limit the scope of the claimed technical solutions.

In a first aspect, the present disclosure provides a game interactive control method comprising:

acquiring game state information and game communication information of a game;

determining a game intention of an agent based on the game state information, wherein the game intention characterizes a battle target of the agent;

inputting the game state information, the game communication information and the game intention into a communication prediction model to obtain target communication content corresponding to the agent;

outputting the target communication content, wherein the target communication content is used to cause a player character in the game to determine a game action to be performed by the agent based on the target communication content.

In a second aspect, the present disclosure provides a game interactive control apparatus, comprising:

a state determination module configured to acquire game state information and game communication information of a game;

an intention determination module configured to determine a game intention of an agent based on the game state information, wherein the game intention characterizes a battle target of the agent;

a communication prediction module configured to input the game state information, the game communication information and the game intention into a communication prediction model to obtain target communication content corresponding to the agent;

an output module configured to output the target communication content, wherein the target communication content is used to cause a player character in the game to determine a game action to be performed by the agent based on the target communication content.

In a third aspect, the present disclosure provides a computer-readable storage medium having stored thereon a computer program which when, executed by a processing device, performs the steps of the method of the first aspect.

In a fourth aspect, the present disclosure provides an electronic device comprising:

a storage device on which a computer program is stored;

a processing device for executing the computer program in said storage device to implement the steps of the method of the first aspect.

Based on the above-mentioned technical solutions, by determining the game intention of the agent according to the game state information, and inputting the game state information, the game communication information and the game intention into the communication prediction model, the target communication content corresponding to the agent is obtained, and then the target communication content is outputted, so that the player character determines a game action to be executed by the agent based on the target communication content. This can not only improve the gaming activity of the real player and the agent upon performing the battle, but also enable the real player to know the game intention of the agent so as to cooperate with the agent and improving the gaming quality.

Other features and advantages of the present disclosure will be described in detail in the following detailed description of preferred embodiments.

BRIEF DESCRIPTION OF THE DRAWINGS

The above and other features, advantages, and aspects of embodiments of the present disclosure will become more apparent with reference to the following figures and embodiments. Throughout the figures, the same or similar reference numerals indicate the same or similar elements. It should be understood that the figures are diagrammatic and that elements are not necessarily drawn to scale. In the figures.

DETAILED DESCRIPTION OF EMBODIMENTS

Figure 1:
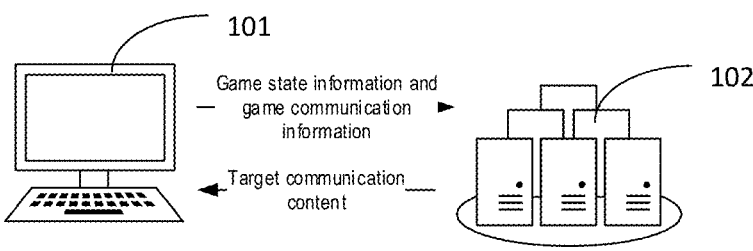
FIG. 1 is a schematic diagram of a scenario illustrating a game interactive control method according to an example embodiment.

Hereinafter, embodiments of the present disclosure will be described in more detail with reference to the accompanying drawings. While certain embodiments of the present disclosure have been illustrated in the accompanying drawings, it is to be understood that the disclosure may be embodied in various forms and should not be construed as being limited to the embodiments set forth herein; rather, these embodiments are provided to help understand the present disclosure more thoroughly and completely. It should be understood that the drawings and examples of the present disclosure are for illustrative purposes only and are not intended to limit the scope of the present disclosure.

It should be understood that the various steps recited in method embodiments of the present disclosure may be performed in a different order and/or in parallel. Moreover, the method embodiments may comprise additional steps and/or omit performing the steps shown. The scope of the present disclosure is not limited in this respect.

As used herein, the terms "comprise", and variations thereof are open-ended terms, i.e., "comprise, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that definitions such as "first" and "second" mentioned in the present disclosure are only intended to distinguish between different devices, modules, or units and are not intended to limit the order or interdependence of the functions performed by the devices, modules, or units.

It is noted that the modifiers such as "one" and "more" mentioned in the present disclosure are intended to be illustrative and not restrictive, and those skilled in the art will understand that they should be interpreted as "one or more" unless the context clearly indicates otherwise.

The names of messages or information interacted between devices in embodiments of the present disclosure are for illustrative purposes only and are not intended to limit the scope of such messages or information.

It should be understood that before the technical solutions disclosed in the various embodiments of the present disclosure are used, it is requisite to notify a user of the type, scope of use, use scenario, etc. of personal information involved in the present disclosure and obtain authorization from the user in an appropriate manner according to relevant laws and regulations.

For example, when the user uses a game AI in a game, prompt information is sent to the user in response to receiving an active request from the user, to explicitly prompt the user that the operation that he requests to execute will require obtaining and using personal information of the user, such as information in the game. Accordingly, the user may, according to the prompt information, autonomously select whether to provide such personal information to software or hardware such as an electronic device, an application, a server or a storage medium, which executes the operation of the technical solution of the present disclosure.

As an alternative but non-limiting implementation, the prompt information may be sent to the user in response to receiving the active request from the user in a manner of a pop-up window in which the prompt information may be presented in a form of a text. In addition, the pop-up window may also carry a selection control for the user to select "agree" or "disagree" to provide the personal information to the electronic device.

It is to be understood that the above-described process of notifying and obtaining the user's authorization is merely illustrative and not limiting of implementations of the present disclosure, and that other ways of satisfying relevant laws and regulations may also be applied to implementations of the present disclosure.

Meanwhile, it may be understood that the data involved in the technical solution (including but not limited to the data itself and the acquisition or use of the data) shall comply with requirements of relevant laws and regulations and relevant provisions.

Before the embodiments of the present disclosure are described in further detail, the nouns and terms referred to in the embodiments of the present disclosure are explained below.

1) Game character: it may also be referred to as a virtual object, and also referred to as a hero in some games, and it refers to a movable object in the game. The movable object may be at least one of a virtual character, a virtual animal, and an animated character. Alternatively, when the game environment is a three-dimensional game environment, the game characters are a three-dimensional stereoscopic model, and each game character has its own shape and size in the three-dimensional game environment, occupying part of the space in the three-dimensional game environment. Alternatively, the game characters may be heroes, soldiers, or neutral creatures in a battling type game. Heroes are taken as the game characters for example illustration in the embodiments of the present disclosure.

2) Agent: it is also referred to as a game AI, or as a human machine, and it refers to a game character in a game that may interact with the game environment. For example, an agent may autonomously accomplish a set goal in a particular gaming environment by communicating and collaborating with or battling against other agents in accordance with its own perception of the gaming environment, and in accordance with existing instructions or through self-learning. It should be appreciated that the behavior of the agent in the game is controlled by artificial intelligence suitable for the game, and that a variety of behaviors may be simulated based on the needs of the game.

Embodiments of the present disclosure will now be described in further detail with reference to the figures and specific embodiments.

FIG. 1 is a schematic diagram of a scenario illustrating a game interactive control method according to an example embodiment. As shown in FIG. 1, the game interactive control method provided by the embodiment of the present disclosure is applicable to an application scenario shown in FIG. 1. The application scenario may comprise a plurality of terminals 101 and a server 102. The data interactive between the terminals 101 and the server 102 may be performed via a wired connection or a wireless connection.

The server 102 may be a server 102 of a game platform, and the terminals 101 may access the server 102 through a game client to play the game. For example, a game player may log into the game through the game client and select a competitive mode, a competitive teammate, a competitive opponent, etc. to play the game. The competitive teammates and/or competitive opponents may be agents, i.e., the game operated by the terminal 101 may be a human-machine battling mode, or a battling mode in which the agent participates.

The human-machine battling mode is taken as an example. In the human-machine battling mode, the terminal 101 may collect game state information and game communication information of the game battle, and send the collected game state information and game communication information to the server 102. The server 102 may receive the game state information and game communication information sent by the terminal 101, and determine a game intention of the agent according to the game state information. The server 102 then inputs the game state information, the game communication information and the game intention into a communication prediction model to obtain target communication content corresponding to the agent. Further, the server 102 transmits the target communication content to the terminal 101 so that the terminal 101 controls the agent to output the target communication content.

Certainly, the game interactive control method provided by the embodiment of the present disclosure may also be independently executed by the terminal 101 during practical application. For example, the communication prediction model is deployed in the terminal 101; the terminal 101 acquires the game state information and game communication information about the game, determines a game intention of the agent according to the game state information, and then inputs the game state information, the game communication information and the game intention into the communication prediction model to obtain target communication content corresponding to the agent, and outputs the target communication content.

Figure 2:
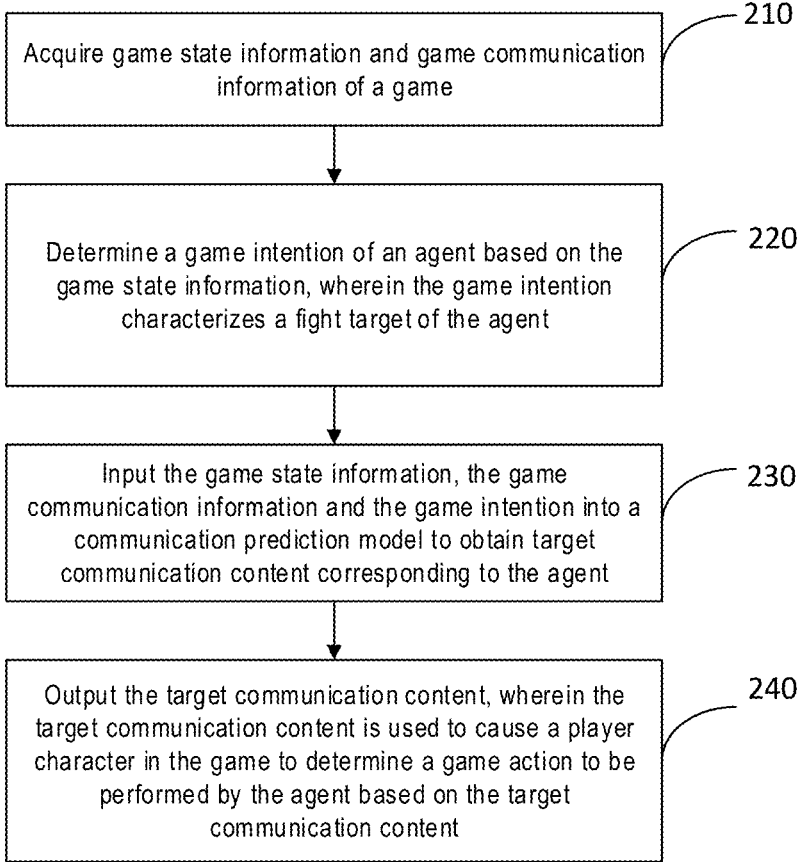
FIG. 2 is a schematic diagram illustrating a game interactive control method according to an example embodiment.

FIG. 2 is a schematic diagram illustrating a game interactive control method according to an example embodiment. The method may be performed by the server 102 or the terminal 101 in FIG. 1. As shown in FIG. 2, the game interactive control method may comprise the following steps:

In step 210, game state information and game communication information of the game is acquired.

Here, the game interaction as indicated by embodiments of the present disclosure refers to communication between an agent and a real player. The game may be a battling type game or any type of game which the agent participates. The game may be composed of a real player and an agent, wherein the agent may act as a teammate or opponent of the real player in the game. Certainly, the game may be a play that is initially composed entirely of real players, but since one or more real players quit during the game, agents will replace the real players to control the play characters.

Illustratively, the game state information comprises at least one of:

character state data of game characters of the game, a game progress of the game, and a game environment where the game characters are.

Wherein the character state data of the game characters may comprise game parties to which the game characters belong, such as a blue party and a red party. The character state data of the game characters may comprise data such as Health Point (HP) of the game characters, Magic Point (MANA POINT, MP) of the game characters, a skill state, an economy state, equipment, and the like. Certainly, character state data may also be represented by other forms of data, for example, the character state data may be a ratio of health points, a ratio of economy states, or the like between game characters.

The game progress in which the game battle is, refers to a time at which the game is currently at, e.g., the game has been on for 30 minutes. Certainly, the game progress of the game may also refer to a period in which the game is in, such as an early stage, a middle stage, a late stage, a final stage, etc. The period in which the game is in may be divided according to the time that the game has already been on. For example, a time period of 0 to 10 minutes is directed to the early stage, a time period of 10 to 28 minutes is directed into the middle stage, a time period of 28 to 40 minutes is directed to the late state, and a time period after 40 minutes is directed to the final stage.

The game environment where the game characters are refers to a terrain, a location, a distance between game characters, etc. in a game map in which the game characters are.

It is appreciated that the game characters mentioned in the embodiments of the present disclosure may comprise game characters manipulated by real players, i.e., player characters; the game characters may also comprise game characters manipulated by game AIs, i.e., agents.

It should be appreciated that the game state information of the game refers to characteristic information reflecting a game situation of the game. The game state information may change over time in the game. The game state information corresponding to the current moment may be referred to as current game state information. Generally speaking, the game state information at the current moment is acquired so as to determine the target communication content of the agent according to the current game situation.

Illustratively, the game communication comprises at least one of:

content of a communication action triggered by the game character in the game, a signal type to which the communication action belongs, and a frequency of the communication action triggered within a preset time period.

The content of the communication action triggered by the game character refers to the content of a communication message sent by the game character. The communication action may be a marker type communication signal, such as an attack signal, a retreat signal, etc. Certainly, the communication action may also be a voice signal transmitted in a voice type, a text signal transmitted in a text type, etc. The communication action may be a type of communication message in a marker type, a voice type, a text type, etc. The frequency of the communication action triggered within the preset time period may refer to a frequency at which the game character in the game sends communication messages within the preset time period. The preset time period may be set according to actual demands, such as a frequency of the game character sending the communication message in the past 100 seconds. It should be appreciated that the frequency at which the game character in the game sends the communication messages within the preset time period may refer to a frequency at which the game character sends a preset type of communication message, or a frequency at which the game character sends all types of communication messages.

It should be appreciated that the game communication information of the game refers to characteristic information for reflecting a communication action state between game characters in the game. The game communication information may change over time in the game. The game communication information corresponding to the current moment may be referred to as current game communication information. Generally, the game communication information at the current time is obtained to determine the target communication content of the agent based on the current communication action state.

In some embodiments, the game state information and the game communication information of the game may be obtained from a game engine. The game engine is a core component of some duly-compiled editable computer game systems or some interactive real-time image applications. Certainly, the game state information and the game communication information of the game may also be obtained by performing image recognition on a game screen of a current frame.

In step 220, a game intention of an agent is determined based on the game state information, wherein the game intention characterizes a battle target of the agent.

Here, since the game state information reflects the current game situation of the game, the game intention of the agent under the current game situation may be obtained according to the game state information. The game intention refers to the agent's battle target to be achieved. The battle target may be a map area, a strategic point, or a map resource that the agent will defend/attack. For example, the agent's battle target may be to help a player character to grab a person, help a player character to clear a line of war, attack an enemy defense tower, clear a wild monster, attack a particular monster in a game (e.g., a BOSS monster such as a large dragon, a small dragon, etc.), obtain a field of view of a dark area of the game map, exclude a field of view guard in the game map, implement a certain game strategy in cooperation with a player character, etc.

As some examples, the game state information may be input into an intention prediction model to obtain the game intention. The intention prediction model may comprise an input layer, a hidden layer and an output layer. The neural network model outputs the game intention according to the input game state information based on a strategy function. By adjusting the parameters of the hidden layer, the outputted game intention may be adjusted.

As other examples, the game state information may be adjusted according to game alignments to which the agent and the player character belong in the game, to obtain target state information suitable for the agent, and the target state information may be input into the intention prediction model to obtain the game intention.

Adjusting the game state information according to game alignments to which the agent and the player character belong in the game means modifying the game state information corresponding to each agent to obtain the target state information. For example, the HP ratio between the agent and other game characters in the game state information is modified, or the economic difference between the agent and other game characters in the game state information is modified to adjust the agent's game intention according to the game situation of the game.

For example, for an agent belonging to an opponent alignment, the HP ratio, the economic ratio, etc. of the player character with respect to the agent may be improved to reduce a desire of the agent belonging to the opponent alignment to attack the player character, or the HP ratio, the economic ratio, etc. of the agent belonging to one's own alignment with respect to the agent belonging to the opponent alignment may be decreased to increase the desire of the agent belonging to the opponent alignment to attack the agent belonging to the one's own alignment.

As another example, for an agent in one's own alignment, the agent's game intention may be modified by adjusting the game state information so that the agent can cooperate with the player character to achieve the battle target to be achieved by the player character, e.g., clear the frontline of minions in cooperation with the player character.

Also for example, for an agent in the opponent alignment, the agent's game intention may be modified by adjusting the game state information so that the agent loses its intention to compete for target strategic resources. For example, when a player character attacks a resource point, the game state information of the agent of the opponent alignment is modified so that the agent of the opponent alignment does not compete for the resource point with the player character.

As still other examples, the game state information may be regarded as an input to an action prediction model, and the game intention of the agent may be extracted from an intention prediction layer of the action prediction model.

Figure 3:
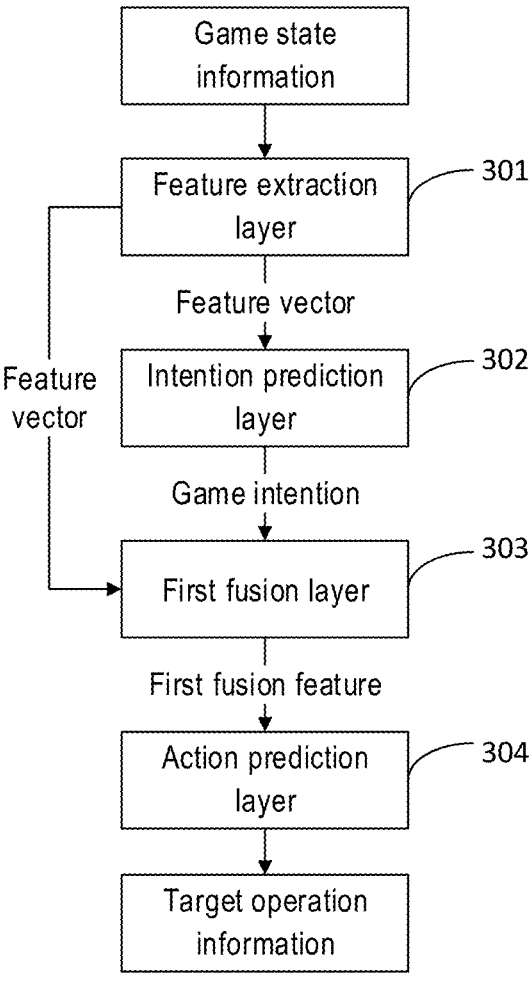
FIG. 3 is a structural diagram illustrating an action prediction model according to an example embodiment.

FIG. 3 is a structural diagram illustrating an action prediction model according to an example embodiment. As shown in FIG. 3, the action prediction model comprises a feature extraction layer 301, an intention prediction layer 302, a first fusion layer 303, and an action prediction layer 304. Wherein the feature extraction layer 301 is configured to extract a feature vector from the game state information, the intention prediction layer 302 is configured to obtain a game intention corresponding to the feature vector according to the feature vector, the first fusion layer 303 is configured to fuse the feature vector with the game intention to obtain a first fusion feature, and the action prediction layer 304 is configured to obtain target operation information corresponding to the agent according to the first fusion feature.

The game intention corresponding to the agent may be obtained by extracting the game intention output by the intention prediction layer 302. It should be noted that the intention prediction layer 302 may also be the intention prediction model described above, and be consistent with the intention prediction model in terms of the achieved function and model logic.

The target operation information is used for controlling the action of the agent. The target operation information may comprise a game action to be performed and a time point at which the game action is performed. When the target operation information is to release the skill B at the time point A, the agent is controlled to release the skill B at the time point A. When the target operation information is to move to a target point D through a preset path from a time point C, the agent is controlled to move to the target point D along the preset path from the time point C. In step 230, the game state information, the game communication information and the game intention are input into the communication prediction model to obtain target communication content corresponding to the agent.

Here, the target communication content outputted by the communication prediction model may be obtained by inputting the game state information, the game communication information and the game intention of the agent into the communication prediction model. The target communication content comprises the content of a communication message to be sent and a target form in which the communication message is sent, i.e., what communication message is sent in what signal type. For example, the communication message "attack Building XXX" is output in a marker form, the communication message "help me to grab a person" is output in a text form, or the communication message "request for support" is outputted in a voice form.

It should be understood that the target communication content that match all of the current game situation, the communication action state of the game character and the battle target of the agent can be obtained through the game state information, the game communication information and the game intention. The target communication content can embody the game intention of the agent so that the real player can understand the game intention of the agent to cooperate with the agent.

It is appreciated that in the embodiment of the present disclosure, the target communication content refer to communication content corresponding to the agent belonging to the same game alignment as the player character. For an agent belonging to a game alignment different from the player character, the agent's target communication content needn't be determined. the agent and the player character belonging to the same game alignment means that the agent and the player character belong to the same team, and the agent and the player character manipulated by the real player are teammates.

In step 240, the target communication content is outputted, wherein the target communication content is used to cause the player character in the game to determine a game action to be performed by the agent based on the target communication content.

Here, since the target communication content comprises the content of the communication message to be sent and the target form in which the communication message is sent, the communication message may be output in the target form. For example, when the target communication content corresponding to the agent is the communication message "request for support" outputted in a voice form, the communication message "request for support" is outputted in a voice form in the user interface. By outputting the target communication content, the player character in the game may be enabled to determine the game action to be performed by the agent based on the target communication content, thereby enabling the player character to cooperate with the agent.

Figure 4A:
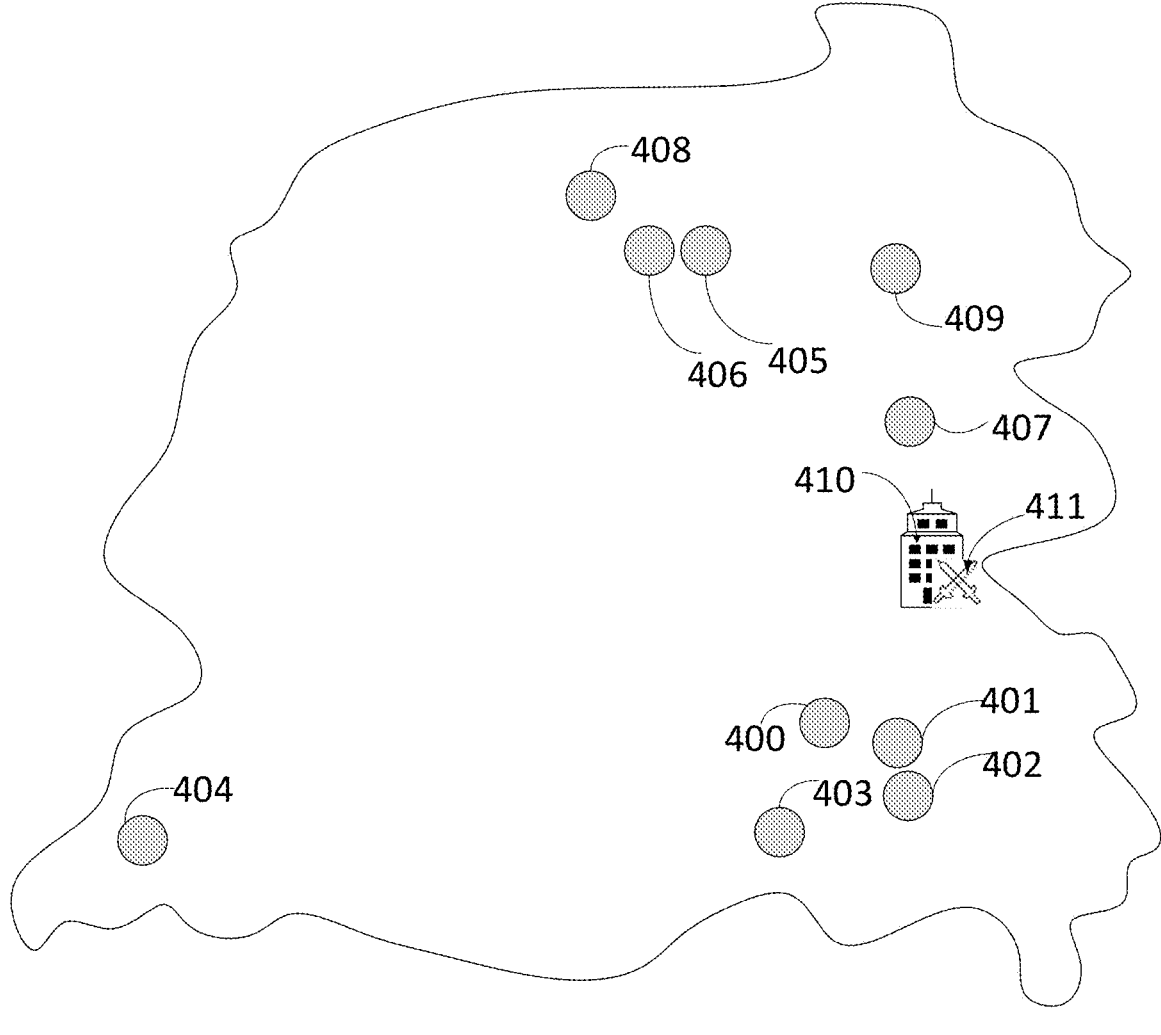
FIG. 4a is a schematic diagram of a game according to an example embodiment.

FIG. 4*a* is a schematic diagram of a game according to an example embodiment. As shown in FIG. 4*a*, the game character in the game comprise a first agent 401, a second agent 402, a third agent 403, a fourth agent 404, a player character 400, a fifth agent 405, a sixth agent 406, a seventh agent 407, an eighth agent 408, and a ninth agent 409. The first agent 401, the second agent 402, the third agent 403, the fourth agent 404 and the player character 400 belong to a first game alignment, the fifth agent 405, the sixth agent 406, the seventh agent 407, the eighth agent 408 and the ninth agent 409 belong to a second game alignment, and the first game alignment and the second game alignment are mutually opponent alignments.

Where the target communication content of the first agent 401 is "attack a resource point 410" outputted in the form of a labeled signal, the resource point 410 may be marked by using a "attack 411" signal so that the player character 400 can learn that the first agent 401 is about to attack the resource point 410 and cooperate with the first agent 401 to attack the resource point 410.

It should be appreciated that the embodiment shown in FIG. 4*a* is only an example, and what type of signal is used to send what kind of communication message in a game depends on the game state information, the game communication information and the game intention. For example, when an agent discovers that a game character in the same lane with it is lost in his own field of view, the agent may also express that "XXX hero has disappeared, please be cautious so as not to be caught" with a personified tone.

Thus, by determining the game intention of the agent according to the game state information, and inputting the game state information, the game communication information and the game intention into the communication prediction model, the target communication content corresponding to the agent is obtained, and then the target communication content is outputted, so that the player character determines a game action to be executed by the agent based on the target communication content. This can not only improve the gaming activity when the real player is battling against the agent, but also enable the real player to know the game intention of the agent so as to cooperate with the agent and improve the gaming quality.

In some embodiments, after the target communication content is determined, the agent may be directly controlled to output the target communication content.

In other embodiments, the target communication content is output in a case where the target communication content is associated with the player character.

The association between the target communication content and the player character means that a battle target indicated by the target communication content requires the cooperation from the player character. For example, when the role of a player is a jungle position, if the target communication content is "the enemy's HP is unhealthy, jungle player come and help go cross the tower to bust the enemy", "our teammate's HP is unhealthy, jungle player come and help clear the frontline of the minions", etc., which indicates that the target communication content of the agent is associated with the player character.

Certainly, the association between the target communication content and the player character may also mean that the player character is capable of cooperating with the agent to achieve its battle target in the current game state. The player character being capable of cooperating with the agent to achieve its battle target in the current game state means that when the agent executes its game intention in a preset position, the player character can reach the preset position and cooperate with the agent to achieve its game intention.

As shown in FIG. 4*a*, when a first agent 401 at a first location determines a target communication content "attack a resource point 410", it may be determined from a second location of the player character 400 that the player character 400 can reach the resource point 410, and the HP state of the player character 400 supports the attack of the resource point 410, and then the target communication content is associated with the player character 400. At this time, the first agent 401 is controlled to output the target communication content "attack a resource point 410", e.g., mark the resource point 410 by using an "attack 411" signal.

It should be noted that whether the target communication content is associated with the player character depends mainly on whether the game intention corresponding to the target communication content requires the player character to cooperate to achieve, and/or, the player character is capable of cooperating with the agent to achieve its game intention in the current game state. If the target communication content is not associated with the player character, the target communication content may not be outputted to avoid outputting too many messages which would affect the player character's gaming experience in the game.

In still other embodiments, in a case where a plurality of the agents in the game simultaneously generate corresponding target communication content, at least one target communication content is selected from the plurality of the target communication content according to the association between the plurality of the target communication content and the player character, and the selected at least one target communication content is outputted.

Here, the plurality of agents in the game simultaneously generating corresponding target communication content means that the multiple agents in the game belonging to the same game alignment as the player character simultaneously generate target communication content. At this time, at least one target communication content is selected from the plurality of target communication content according to the association between the plurality of target communication content and the player character, and the selected target communication content is output.

Target communication content having the greatest association with the player character among the plurality of target communication content may be selected as the target communication content to be outputted. Certainly, target communication content whose association with the player character is greater than a preset threshold may be selected as the target communication content to be outputted.

Illustratively, a degree of the association between the target communication content and the player character may be determined by a distance between the agent corresponding to the target communication content and the player character. The magnitude of the association is inversely related to the distance, i.e., the closer the distance is, the greater the association is.

Figure 4B:
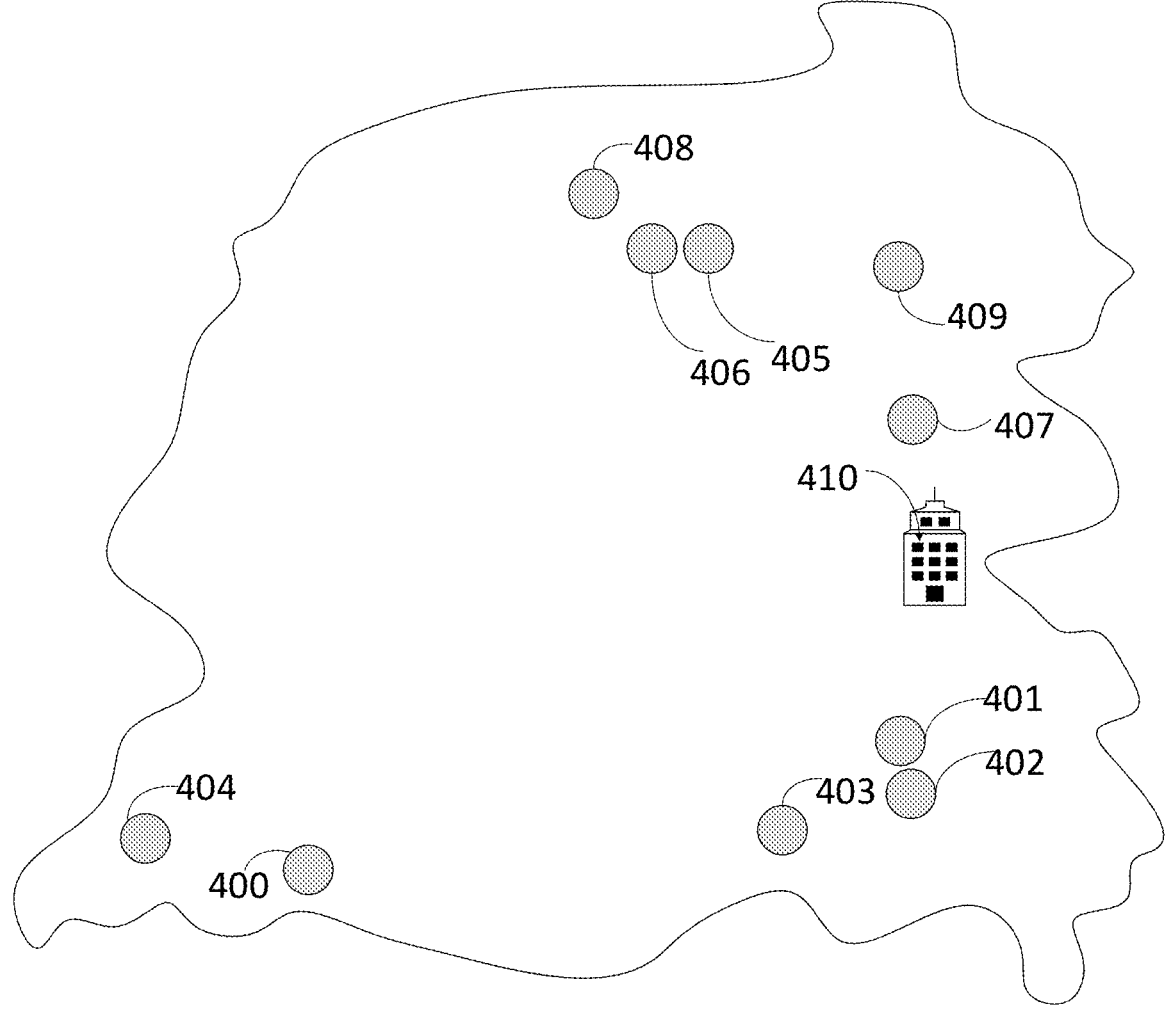
FIG. 4b is a schematic illustration of a game according to yet another example embodiment.

FIG. 4b is a schematic illustration of a game according to yet another example embodiment. As shown in FIG. 4b, at the current moment, the target communication content generated by the first agent 401 is "attack resource point 410", and the target communication content generated by the fourth agent 404 is "HP is low, request for back up". It may be determined based on the distance between the player character 400 and the first agent 401 and based on the distance between the player character 400 and the fourth agent 404 that the association between the target communication content generated by the first agent 401 and the player character 400 is less than the association between the target communication content generated by the fourth agent 404 and the player character 400. At this time, the communication content "HP is low, request for back up" may be outputted.

Certainly, the degree of the association between the target communication content and the player character may also be determined according to a preset value corresponding to the game intention corresponding to the target communication content. For example, for each game intention, a corresponding preset value may be set according to the degree of importance between the game intention and the player character. Different game intentions correspond to different preset values.

Thus, in the case where a plurality of agents in the game simultaneously generate corresponding target communication content, by selecting the target communication content with a high degree of association from the plurality of target communication content for outputting, it is possible to avoid simultaneously outputting a plurality of messages in the process of the game to affect the game judgment of the real player. In addition, this can avoid outputting the communication content frequently, and ensure that the real player will not be disturbed too much in human-machine battle mode on the premise of ensuring the real player can cooperate with the agent. In some implementations that can be achieved, the communication prediction model comprises:

a multilayer perceptron configured to encode the game state information and the game communication information to obtain a state feature code;

a second fusion layer configured to receive the game intention output by the intention prediction layer and fuse the game intention with the state feature code to obtain a second fusion feature;

a communication prediction layer configured to determine the target communication content based on the second fusion feature.

Here, the multilayer perceptron (MLP) is a feed-forward artificial neural network model. By encoding the game state information and game communication information through the multilayer perceptron, features related to the game situation and the communication action state of the game character may be extracted, so that the communication prediction layer can determine the current game situation and communication action state based on the state feature code and determine the appropriate communication content. Furthermore, acquiring the game intention output from the intention prediction layer, and fusing the game intention with the state feature code may assist the communication prediction model to obtain appropriate target communication content, and the target communication content can represent the game intention of the agent, thereby achieving the output of the battle target of the agent in a personalized tone.

Figure 5:
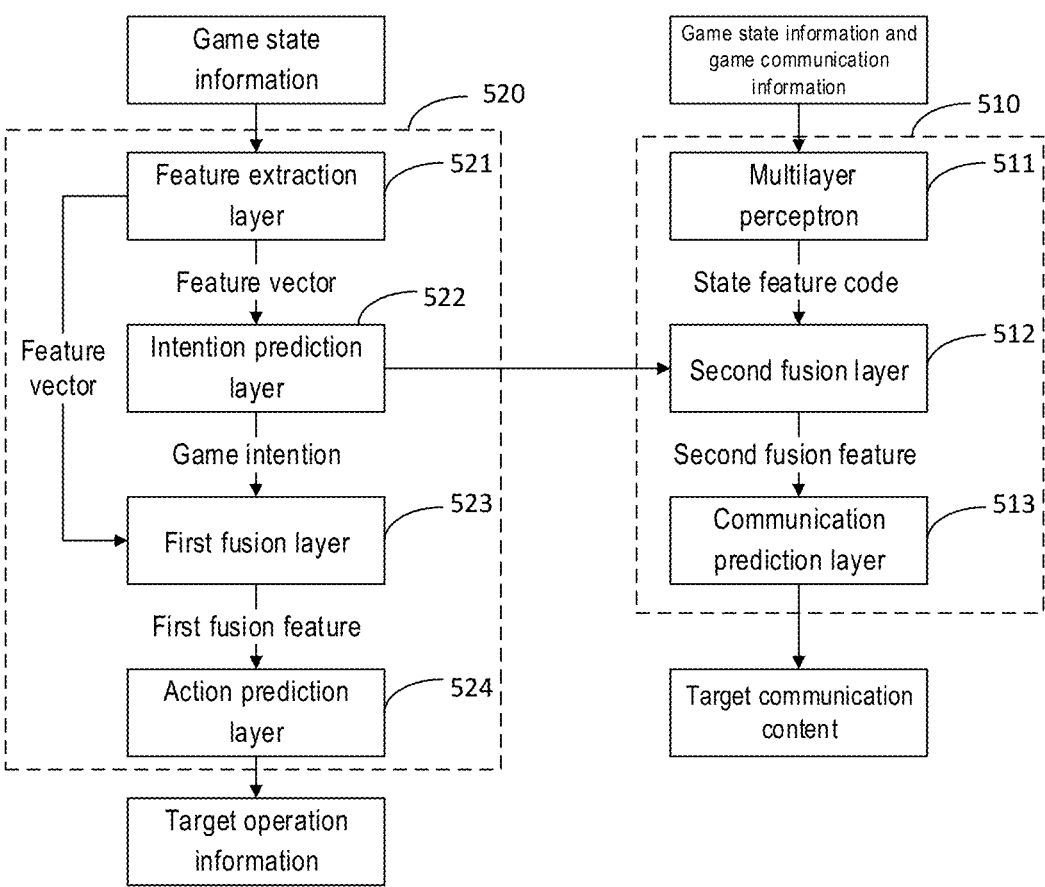
FIG. 5 is a structural schematic diagram illustrating a communication prediction model in accordance with an example embodiment.

FIG. 5 is a structural schematic diagram illustrating a communication prediction model in accordance with an example embodiment. As shown in FIG. 5, the communication prediction model 510 comprises a multilayer perceptron 511, a second fusion layer 512, and a communication prediction layer 513. The action prediction model 520 comprises a feature extraction layer 521, an intention prediction layer 522, a first fusion layer 523, and an action prediction layer 524. Wherein the feature extraction layer 521 is configured to extract a feature vector from game state information, the intention prediction layer 522 is configured to obtain a game intention corresponding to the feature vector according to the feature vector, the first fusion layer 523 is configured to fuse the feature vector with the game intention to obtain a first fusion feature, and the action prediction layer 524 is configured to obtain target operation information corresponding to the agent according to the first fusion feature.

The multilayer perceptron 511 encodes the game state information and the game communication information to obtain a state feature code; the second fusion layer 512 receives the game intention output by the intention prediction layer 522, and fuses the game intention with the state feature code to obtain a second fusion feature; and the communication prediction layer 513 determines the target communication content according to the second fusion feature.

Thus, it is possible, through the communication prediction model described above, to obtain the personalized target communication content representing the game intention of the agent, and improve the flexibility between the agent and the real player. In some implementations that can be achieved, the communication prediction model is obtained by the following steps:

acquiring historical game state information and historical game communication information of historical game within a preset time period;

determining a historical game intention of a player character of the historical game within the preset time period according to the historical game state information and the historical game communication information;

labeling the historical game intention, the historical game state information and the historical game communication information by preset communication content to obtain a first training sample, wherein said preset communication content is determined according to the historical communication information;

training a machine learning model based on the first training sample to obtain the communication prediction model.

Here, the historical game may refer to a game composed of real players. For each historical game, the historical game state information and historical game communication information within a preset time period are extracted from the historical game. Here, the preset time period may be a time duration according to a preset setting, for example 5 seconds. The historical game state information and the historical game communication information within the preset time period can reflect the game situation and the communication action feature of the game character within the preset time period.

It should be understood that the meaning of the historical game state information and the historical game communication information is consistent with the meaning of the game state information and the game communication information described above and will not be described in detail herein.

The historical game intention of the player character in the historical game within the preset time period may be determined through the historical game state information and the historical game communication information. The meaning of the historical game intention is consistent with the meaning of the game intention described above. Certainly, the historical game intention refers to the battle target of the real player within the preset time period.

Illustratively, the historical game state information and the historical game communication information may be input into a game intention prediction model to obtain a historical game intention. The game intention prediction model is obtained by training a machine learning model with a second training sample, and the second training sample comprising the historical game state information and historical game communication information labeled with the game intention.

It is noted that the game intention prediction model may comprise an input layer, a hidden layer and an output layer, and the neural network model outputs the historical game intention according to the input historical game state information and historical game communication information based on a strategy function. The output historical game intention may be adjusted by adjusting the parameters of the hidden layer. Reference may be made to a conventional model training method as to how to train a machine learning model via a second training sample, which will not be described in detail herein.

The first training sample may be obtained by labeling corresponding preset communication content on the historical game intention, the historical game state information and the historical game communication information after obtaining the historical game intention, and then the machine learning model is trained using the first training sample to obtain the communication prediction model.

The preset communication content is determined according to historical communication information. That is, the preset communication content is determined according to the historical communication information within the preset time period. Illustratively, one piece of communication content may be selected from the historical communication information within the preset time period as the preset communication content. Certainly, it is also possible to perform semantic interpretation on the historical communication information within the preset time period, obtain a language behavior purpose characterized by the historical communication information, and generate the preset communication content based on the language behavior purpose.

It should be noted that by determining the preset communication content from the historical communication information, the communication prediction model is enabled to learn the real player's communication manners and language habits, so that the target communication content outputted by the communication prediction model may be more personified.

Thus, the communication prediction model obtained by the first training sample enables the agent to communicate with the real player with a higher degree of personification, thereby improving the real player's game experience.

Figure 6:
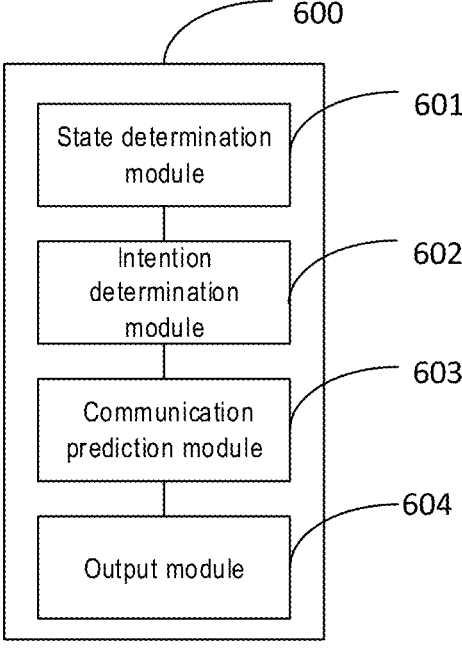
FIG. 6 is a structural schematic diagram of a game interactive control apparatus according to an example embodiment.

FIG. 6 is a structural schematic diagram of a game interactive control apparatus according to an example embodiment. As shown in FIG. 6, an embodiment of the present disclosure provides a game interactive control apparatus 600, comprising:

a state determination module 601 configured to acquire game state information and game communication information of a game;

an intention determination module 602 configured to determine a game intention of an agent based on the game state information, wherein the game intention characterizes a battle target of the agent;

a communication prediction module 603 configured to input the game state information, the game communication information and the game intention into a communication prediction model to obtain a target communication content corresponding to the agent;

an output module 604 configured to output the target communication content, wherein the target communication content is used to cause a player character in the game to determine a game action to be performed by the agent based on the target communication content.

Optionally, the intention determination module 602 is specifically configured to:

take the game state information as an input to an action prediction model, and extract a game intention of the agent from an intention prediction layer of the action prediction model;

wherein the action prediction model comprises a feature extraction layer, the intention prediction layer, a first fusion layer and an action prediction layer;

the feature extraction layer is configured to extract a feature vector from the game state information;

the intention prediction layer is configured to obtain a game intention corresponding to the feature vector according to the feature vector;

the first fusion layer is configured to fuse the feature vector with the game intention to obtain a first fusion feature;

the action prediction layer is configured to obtain target operation information corresponding to the agent according to the first fusion feature, wherein the target operation information is used for controlling an action of the agent.

Optionally, the communication prediction model comprises:

a multilayer perceptron configured to encode the game state information and the game communication information to obtain a state feature code;

a second fusion layer configured to receive the game intention output by the intention prediction layer and fuse the game intention with the state feature code to obtain a second fusion feature;

a communication prediction layer configured to determine the target communication content based on the second fusion feature.

Optionally, the communication prediction module 603 comprises:

an acquisition unit configured to acquire historical game state information and historical game communication information of a historical game within a preset time period;

a determination unit configured to determine a historical game intention of a player character of the historical game within the preset time period according to the historical game state information and the historical game communication information;

a labeling unit configured to label the historical game intention, the historical game state information and the historical game communication information by a preset communication content to obtain a first training sample, wherein the preset communication content is determined according to the historical communication information;

a training unit configured to train a machine learning model based on the first training sample to obtain the communication prediction model.

Optionally, the determination unit is specifically configured to:

obtain the historical game intention by using the historical game state information and the historical game communication information as an input to a game intention prediction model;

wherein the game intention prediction model is obtained by training the machine learning model with a second training sample, the second training sample comprising historical game state information labeled with the game intention and the historical game communication information.

Optionally, the game state information comprises at least one of:

character state data of game characters of the game, a game progress of the game, and a game environment where the game characters are in, a ratio of blood volumes of the game characters in the game, an economic difference between the game characters, a level of the game characters, a game progress of the game, location information of the game characters, and a distance between the game characters.

The game communication information comprises at least one of:

content of a communication action triggered by the game character in the game, a signal type to which the communication action belongs, and a frequency at which the communication action is triggered within a pre-set time period.

Optionally, the output module 604 is specifically configured to:

output the target communication content in a case where the target communication content is associated with the player character;

select at least one target communication content from the plurality of target communication content according to an association between the plurality of target communication content and the player character, and output the selected at least one target communication content in a case where a plurality of said agents in the game simultaneously generate the corresponding target communication content.

With respect to the apparatus 600 in the above-described embodiments, the specific manners in which its modules perform operations have been described in detail in the embodiments of the method and will not be described in detail herein.

Figure 7:
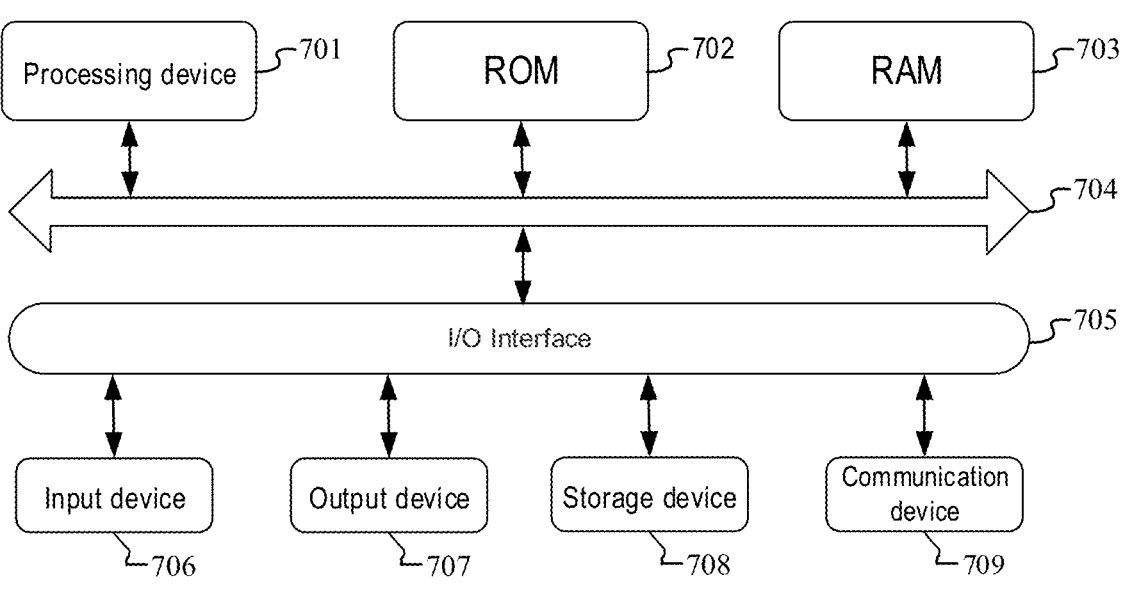
FIG. 7 is a structural schematic diagram of an electronic device according to an example embodiment.

Reference is now made to FIG. 7, which illustrates a structural schematic diagram of an electronic device (e.g., a terminal or server in FIG. 1) 700 suitable for implementing an embodiment of the present disclosure. The terminals in the embodiments of the present disclosure may comprise, but are not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 7 is merely an example and should not impose any limitations on the functionality and scope of use of embodiments of the present disclosure.

As shown in FIG. 7, the electronic device 700 may comprise a processing device (e.g., a central processing unit, a graph processor, etc.) 701 that may perform various suitable actions and processes in accordance with a program stored in a read only memory (ROM) 702 or a program loaded from a storage device 708 into a random access memory (RAM) 703. In the RAM 703, various programs and data needed by the operation of the electronic device 700 are also stored. The processing device 701, the ROM 702, and the RAM 703 are connected to each other via a bus 704. An input/output (I/O) interface 705 is also coupled to bus 704.

In general, the following devices may be connected to the I/O interface 705: an input device 706 including, for example, a touch screen, a touch pad, a keyboard, a mouse, a camera, a microphone, an accelerometer, a gyroscope, etc.; an output device 707 including, for example, a liquid crystal display (LCD), a speaker, a vibrator, etc.; a storage device 708 including, for example, a magnetic tape, a hard disk, etc.; and a communication device 709. The communication device 709 may allow the electronic device 700 to communicate in a wireless or wired manner with other devices to exchange data. While FIG. 7 illustrates the electronic device 700 having various devices, it is to be understood that not all illustrated device are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure comprise a computer program product comprising a computer program carried on a non-transitory computer-readable medium, the computer program comprising program code for performing the method illustrated by the flow charts. In such embodiments, the computer program may be downloaded and installed from a network via the communication means 709, or installed from the storage means 708, or installed from the ROM 702. When the computer program is executed by the processing device 701, the above-described functions defined in the method of the embodiment of the present disclosure are performed.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

In some embodiments, the terminal, server may communicate using any currently known or future-developed network protocol, such as HTTP (HyperText Transfer Protocol), and may be interconnected with any form or medium of digital data communication (e.g., a communication network). Examples of the communication network comprise local area networks ("LANs"), wide area networks ("WANs"), international networks (e.g., the Internet), and peer-to-peer networks (e.g., ad hoc peer-to-peer networks), as well as any currently known or future-developed networks.

The computer readable medium may be contained in the above-described electronic device; it may also be present separately and not installed into the electronic device.

The computer-readable medium carries one or more programs that, when executed by the electronic device, cause the electronic device to: acquire game state information and game communication information of a game; determine a game intention of an agent based on the game state information, wherein the game intention characterizes a battle target of the agent; input the game state information, the game communication information and the game intention into a communication prediction model to obtain target communication content corresponding to the agent; output the target communication content, wherein the target communication content is used to cause a player character in the game to determine a game action to be performed by the agent based on the target communication content.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The modules described in connection with the embodiments disclosed herein may be implemented in a software or hardware manner. The names of the modules do not constitute limitations of the modules themselves in a certain case.

The functions described herein above may be performed, at least in part, by one or more hardware logic components. For example, without limitation, example types of hardware logic components that may be used comprise: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of this disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also include other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims. With respect to the apparatus in the above-described embodiments, the specific manner in which the various modules perform the operations has been described in detail in the embodiments of the method and will not be described in detail herein.

We claim:

1. A game interactive control method, comprising:
acquiring game state information and game communication information of a game;
determining a game intention of an agent based on the game state information, wherein the game intention characterizes a battle target of the agent;
inputting the game state information, the game communication information and the game intention into a communication prediction model to obtain target communication content corresponding to the agent;
outputting the target communication content, wherein the target communication content is used to cause a player character in the game to determine a game action to be performed by the agent based on the target communication content;
wherein the determining the game intention of the agent based on the game state information comprises:
taking the game state information as an input to an action prediction model, and extracting the game intention of the agent from an intention prediction layer of the action prediction model;
wherein the action prediction model comprises a feature extraction layer the intention prediction layer, a first fusion layer and an action prediction layer;
the feature extraction layer is configured to extract a feature vector from the game state information;
the intention prediction layer is configured to obtain a game intention corresponding to the feature vector according to the feature vector;
the first fusion layer is configured to fuse the feature vector with the game intention to obtain a first fusion feature;

the action prediction layer is configured to obtain target operation information corresponding to the agent according to the first fusion feature, wherein the target operation information is used for controlling an action of the agent.

2. The method according to claim 1, wherein the communication prediction model comprises:
a multilayer perceptron configured to encode the game state information and the game communication information to obtain a state feature code;
a second fusion layer configured to receive the game intention output by the intention prediction layer and fuse the game intention with the state feature code to obtain a second fusion feature;
a communication prediction layer configured to determine the target communication content based on the second fusion feature.

3. The method according to claim 1, wherein the communication prediction module is obtained with the following steps:
acquiring historical game state information and historical game communication information of a historical game within a preset time period;
determining a historical game intention of a player character of the historical game within the preset time period according to the historical game state information and the historical game communication information;
labeling the historical game intention, the historical game state information and the historical game communication information by a preset communication content to obtain a first training sample, wherein the preset communication content is determined according to the historical communication information;
training a machine learning model based on the first training sample to obtain the communication prediction model.

4. The method according to claim 3, wherein the determining a historical game intention of a player character of the historical game within the preset time period according to the historical game state information and the historical game communication information comprises:
inputting the historical game state information and the historical game communication information into a game intention prediction model to obtain the historical game intention;
wherein the game intention prediction model is obtained by training the machine learning model with a second training sample, the second training sample comprising historical game state information and the historical game communication information labeled with the game intention.

5. The method according to claim 1, wherein the game state information comprises at least one of:
character state data of game characters of the game, a game progress of the game, and a game environment where the game characters are in;
the game communication information comprises at least one of:
content of a communication action triggered by the game character in the game, a signal type to which the communication action belongs, and a frequency at which the communication action is triggered within a pre-set time period.

6. The method according to claim 1, wherein the outputting the target communication content comprises:

outputting the target communication content in a case where the target communication content is associated with the player character; or in a case where a plurality of said agents in the game simultaneously generate a plurality of corresponding target communication content, selecting the target communication content from the plurality of target communication content according to an association between the plurality of target communication content and the player character, and outputting the target communication content.

7. A non-transitory computer-readable storage medium having a computer program stored thereon which when, executed by a processing device, performs the steps:

acquiring game state information and game communication information about a game;

determining a game intention of an agent based on the game state information, wherein the game intention characterizes a battle target of the agent;

inputting the game state information, the game communication information and the game intention into a communication prediction model to obtain target communication content corresponding to the agent;

outputting the target communication content, wherein the target communication content is used to cause a player character in the game to determine a game action to be performed by the agent based on the target communication content;

the determining the game intention of the agent based on the game state information comprises:

taking the game state information as an input to an action prediction model, and extracting the game intention of the agent from an intention prediction layer of the action prediction model;

wherein the action prediction model comprises a feature extraction layer, the intention prediction layer, a first fusion layer and an action prediction layer;

the feature extraction layer is configured to extract a feature vector from the game state information;

the intention prediction layer is configured to obtain a game intention corresponding to the feature vector according to the feature vector;

the first fusion layer is configured to fuse the feature vector with the game intention to obtain a first fusion feature;

the action prediction layer is configured to obtain target operation information corresponding to the agent according to the first fusion feature, wherein the target operation information is used for controlling an action of the agent.

8. The non-transitory computer-readable storage medium according to claim 7, wherein the communication prediction model comprises:

a multilayer perceptron configured to encode the game state information and the game communication information to obtain a state feature code;

a second fusion layer configured to receive the game intention output by the intention prediction layer and fuse the game intention with the state feature code to obtain a second fusion feature;

a communication prediction layer configured to determine the target communication content based on the second fusion feature.

9. The non-transitory computer-readable storage medium according to claim 7, wherein the communication prediction module is obtained with the following steps:

acquiring historical game state information and historical game communication information of a historical game within a preset time period;

determining a historical game intention of a player character of the historical game within the preset time period according to the historical game state information and the historical game communication information;

labeling the historical game intention, the historical game state information and the historical game communication information by a preset communication content to obtain a first training sample, wherein the preset communication content is determined according to the historical communication information;

training a machine learning model based on the first training sample to obtain the communication prediction model.

10. The non-transitory computer-readable storage medium according to claim 9, wherein the determining a historical game intention of a player character of the historical game within the preset time period according to the historical game state information and the historical game communication information comprises:

inputting the historical game state information and the historical game communication information into a game intention prediction model to obtain the historical game intention;

wherein the game intention prediction model is obtained by training the machine learning model with a second training sample, the second training sample comprising historical game state information and the historical game communication information labeled with the game intention.

11. The non-transitory computer-readable storage medium according to claim 7, wherein the game state information comprises at least one of:

character state data of game characters of the game, a game progress of the game, and a game environment where the game characters are in;

the game communication information comprises at least one of:

content of a communication action triggered by the game character in the game, a signal type to which the communication action belongs, and a frequency at which the communication action is triggered within a pre-set time period.

12. The non-transitory computer-readable storage medium according to claim 7, wherein the outputting the target communication content comprises:

outputting the target communication content in a case where the target communication content is associated with the player character; or in a case where a plurality of said agents in the game simultaneously generate a plurality of corresponding target communication content, selecting the target communication content from the plurality of target communication content according to an association between the plurality of target communication content and the player character, and outputting the target communication content.

13. An electronic device, wherein the electronic device comprises:

a storage device on which a computer program is stored;

a processing device for executing the computer program in said storage device to implement the steps:

acquiring game state information and game communication information about a game;

determining a game intention of an agent based on the game state information, wherein the game intention characterizes a battle target of the agent;

inputting the game state information, the game communication information and the game intention into a communication prediction model to obtain target communication content corresponding to the agent;

outputting the target communication content, wherein the target communication content is used to cause a player character in the game to determine a game action to be performed by the agent based on the target communication content;

wherein the determining the game intention of the agent based on the game state information comprises:

taking the game state information as an input to an action prediction model, and extracting the game intention of the agent from an intention prediction layer of the action prediction model;

wherein the action prediction model comprises a feature extraction layer, the intention prediction layer, a first fusion layer and an action prediction layer;

the feature extraction layer is configured to extract a feature vector from the game state information;

the intention prediction layer is configured to obtain a game intention corresponding to the feature vector according to the feature vector;

the first fusion layer is configured to fuse the feature vector with the game intention to obtain a first fusion feature;

the action prediction layer is configured to obtain target operation information corresponding to the agent according to the first fusion feature, wherein the target operation information is used for controlling an action of the agent.

14. The electronic device according to claim 13, wherein the communication prediction model comprises:

a multilayer perceptron configured to encode the game state information and the game communication information to obtain a state feature code;

a second fusion layer configured to receive the game intention output by the intention prediction layer and fuse the game intention with the state feature code to obtain a second fusion feature;

a communication prediction layer configured to determine the target communication content based on the second fusion feature.

15. The electronic device according to claim 13, wherein the communication prediction module is obtained with the following steps:

acquiring historical game state information and historical game communication information of a historical game within a preset time period;

determining a historical game intention of a player character of the historical game within the preset time period according to the historical game state information and the historical game communication information;

labeling the historical game intention, the historical game state information and the historical game communication information by a preset communication content to obtain a first training sample, wherein the preset communication content is determined according to the historical communication information;

training a machine learning model based on the first training sample to obtain the communication prediction model.

16. The electronic device according to claim 15, wherein the determining a historical game intention of a player character of the historical game within the preset time period according to the historical game state information and the historical game communication information comprises:

inputting the historical game state information and the historical game communication information into a game intention prediction model to obtain the historical game intention;

wherein the game intention prediction model is obtained by training the machine learning model with a second training sample, the second training sample comprising historical game state information and the historical game communication information labeled with the game intention.

17. The electronic device according to claim 13, wherein the game state information comprises at least one of:

character state data of game characters of the game, a game progress of the game, and a game environment where the game characters are in;

the game communication information comprises at least one of:

content of a communication action triggered by the game character in the game, a signal type to which the communication action belongs, and a frequency at which the communication action is triggered within a pre-set time period.

* * * * *